(12) United States Patent
Hinton et al.

(10) Patent No.: US 10,169,723 B2
(45) Date of Patent: Jan. 1, 2019

(54) DISTRIBUTED POLICY DISTRIBUTION FOR COMPLIANCE FUNCTIONALITY

(75) Inventors: Heather Maria Hinton, Austin, TX (US); Ivan Matthew Milman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1405 days.

(21) Appl. No.: 12/616,330

(22) Filed: Nov. 11, 2009

(65) Prior Publication Data
US 2011/0112974 A1     May 12, 2011

(51) Int. Cl.
  G06Q 10/06      (2012.01)
  G06Q 30/00      (2012.01)
(52) U.S. Cl.
  CPC ....... *G06Q 10/06* (2013.01); *G06Q 10/06393* (2013.01); *G06Q 30/018* (2013.01)
(58) Field of Classification Search
  USPC .......................................... 705/38; 707/1, 3
  See application file for complete search history.

(56) References Cited

U.S. PATENT DOCUMENTS

| | | | |
|---|---|---|---|
| 2001/0056398 A1 | 12/2001 | Scheirer | |
| 2005/0144026 A1* | 6/2005 | Bennett | G06Q 50/22 714/2 |
| 2005/0257267 A1* | 11/2005 | Williams et al. | 726/25 |
| 2006/0155738 A1 | 7/2006 | Baldwin et al. | |
| 2006/0179476 A1* | 8/2006 | Challener et al. | 726/4 |
| 2007/0011147 A1 | 1/2007 | Falkenberg | |

(Continued)

*Primary Examiner* — Gabrielle A McCormick
(74) *Attorney, Agent, or Firm* — Jeffrey S. LaBaw; David H. Judson

(57) ABSTRACT

A multi-component auditing environment uses a set of log-enabled components that are capable of being triggered during an information flow in a data processing system. A "master" compliance component receives data from each log-enabled component in the set of log-enabled components, the data indicating a set of logging properties that are associated with or provided by that log-enabled component. The master compliance component determines, for a given compliance policy, which of a set of one or more events are required from one or more of the individual log-enabled components in the set of log-enabled components. As a result of the determining step, the master compliance component then configures one of more of the individual log-enabled components, e.g. by generating one or more configuration events that are then sent to the one or more individual components. This configuration may take place remotely, i.e., over a network connection. As a result of the information flow, audit or other logs are then collected from the log-enabled components. The master compliance component evaluates the collected logs to determine compliance with the compliance policy. As necessary, the master compliance component re-configures one or more log-enabled components in the set of log-enabled components to address any compliance issues arising from the evaluation. Thus, once a given compliance policy is specified, typically the individual log-enabled components in the multiple-component environment are not responsible for their own configuration, as that task is undertaken by the master compliance component.

24 Claims, 4 Drawing Sheets

(56) References Cited

U.S. PATENT DOCUMENTS

| | | | |
|---|---|---|---|
| 2007/0156694 A1* | 7/2007 | Lim | G06F 21/6218 |
| 2007/0203718 A1* | 8/2007 | Merrifield, Jr. | 705/1 |
| 2008/0071728 A1* | 3/2008 | Lim | 707/1 |

* cited by examiner

DISTRIBUTED POLICY DISTRIBUTION FOR COMPLIANCE FUNCTIONALITY

BACKGROUND OF THE INVENTION

Technical Field

This disclosure relates generally to configuration of software components used in a distributed computing environment, where such components are used to produce logs for purposes of compliance analysis, problem determination, and forensics, among others.

Background of the Related Art

Businesses often have to provide information to show compliance with different government regulations. These regulations include, for example, the Sarbanes-Oxley (SOX) Act, the Health Insurance Portability and Accountability Act (HIPAA), and the like. Often times, compliance with these and other regulations may be shown using information contained in audit logs maintained by information technology (IT) organizations. For compliance reasons, these audit logs often are maintained for years. Audit logs are useful for checking the enforcement and effectiveness of information technology controls, accountability, and vulnerability, and/or risk analysis. An information technology organization also may use auditing of security related critical activities to aid in forensic investigations, such as security incidents that may occur. When a security incident occurs, an audit log enables an analysis of the history of activities that occurred prior to the security incident occurring. These activities include, who did what, when, where, and how. With the analysis of an audit log, appropriate corrective actions may be taken. Audit logs are typically made available in relational databases to allow easy querying of the information by reporting programs or software to generate operational and trend reports.

While compliance may be seen to ensure the ability to ensure that a security policy is enforced, compliance may also be applied to other types of policy, such as service level agreements (e.g. using timestamps on audit logs to ensure that an overall Service Level Agreement (SLA) is satisfied), legislative compliance (e.g., on control or release of privacy-related information), or even policy management itself (e.g., who changed a policy, when and how, and was it in compliance with the policy for compliance-policy-management).

Further, compliance with a particular policy, or a detailed forensics examination of actions within a system, may require more than just "audit" logs. It may also require access to error and trace logs, typically used within the scope of a problem determination examination.

When determining a system's compliance with a desired policy, typically logs (such as audit logs) are searched and used as the basis for validating that a policy is successfully implemented and/or a user is bound by that policy. While such approaches generally work well for their intended purpose, one difficulty with this approach is that as more and more components become involved in the overall information flow, there are many more sources of audit log records. Typically, each of these sources corresponds to a single compliance component, and there may be multiple individual components in the workflow, each individually configurable with respect to an audit policy. In such case, the evaluation of audit policy to ensure compliance with that policy depends on the configuration of multiple components, where each component must be individually configured to produce the audit records required for compliance demonstration.

Further, the evaluation of compliance with an overall audit policy may require more or less detail than is required for an individual component's audit evaluation. As an example, one compliance analysis may require that an action against a component triggered by a "root level" user be traced an entire way through a system. This may require tracking events that normally would be generated as part of trace logging utilities and thus configured independently of an audit log facility. Prior approaches do not provide the capability to address this type of requirement.

BRIEF SUMMARY OF THE INVENTION

The subject disclosure is implemented within a multiple-component logging environment in which policy compliance in a data processing system uses a set of logging components that are capable of being triggered during an information flow. A "master" compliance component (also referred to herein as an "compliance utility") receives data from each log-enabled component in the set of log-enabled components, the data indicating a set of logging properties that are associated with or provided by that log-enabled component. In operation, the master compliance component determines, for a given compliance policy, which of a set of one or more events are required from one or more of the individual log-enabled components in the set of log-enabled components. As a result of the determining step, the master compliance component then configures one of more of the individual log-enabled components, e.g., by generating one or more configuration events that are then sent to the one or more individual components. This configuration may take place remotely, i.e., over a network connection. As a result of the information flow, audit and other logs are then collected from the log-enabled components. The master compliance component evaluates the collected logs to determine compliance with the compliance policy. As necessary, the master compliance component re-configures one or more log-enabled components in the set of log-enabled components to address any compliance issues arising from the evaluation.

Accordingly, the master compliance component is responsible for examining the logs produced by the individual log-enabled components involved in a particular information flow, and the master compliance component is capable of configuring these individual components to produce the audit and other logs required for a given compliance policy. Thus, once the given compliance policy is specified, typically the individual log-enabled components in the multiple-component environment are no longer responsible for their own configuration, as that task is undertaken by the master compliance component. Instead, the master compliance component is able to configure the logging of required events at the set of individual components (which are typically distributed), as required, to satisfy the compliance policy.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
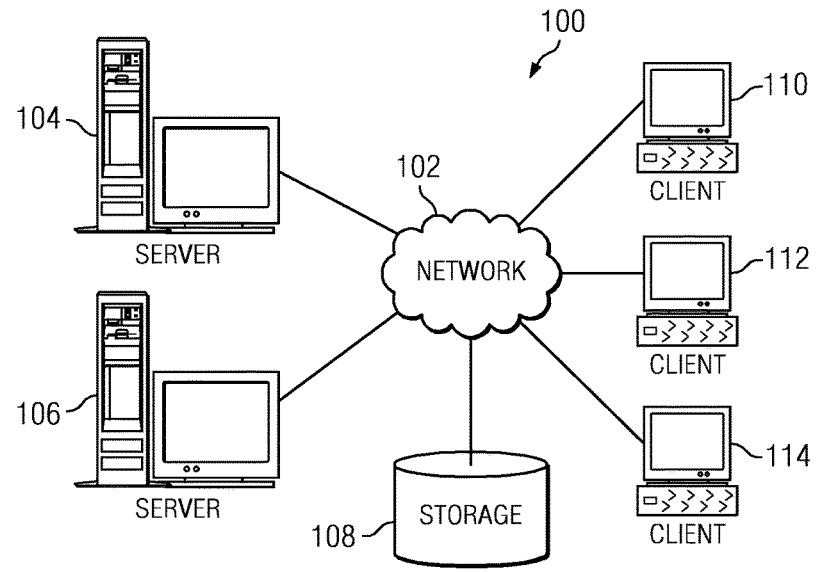
FIG. 1 depicts an exemplary block diagram of a distributed data processing environment in which exemplary aspects of the illustrative embodiments may be implemented.
Figure 2:
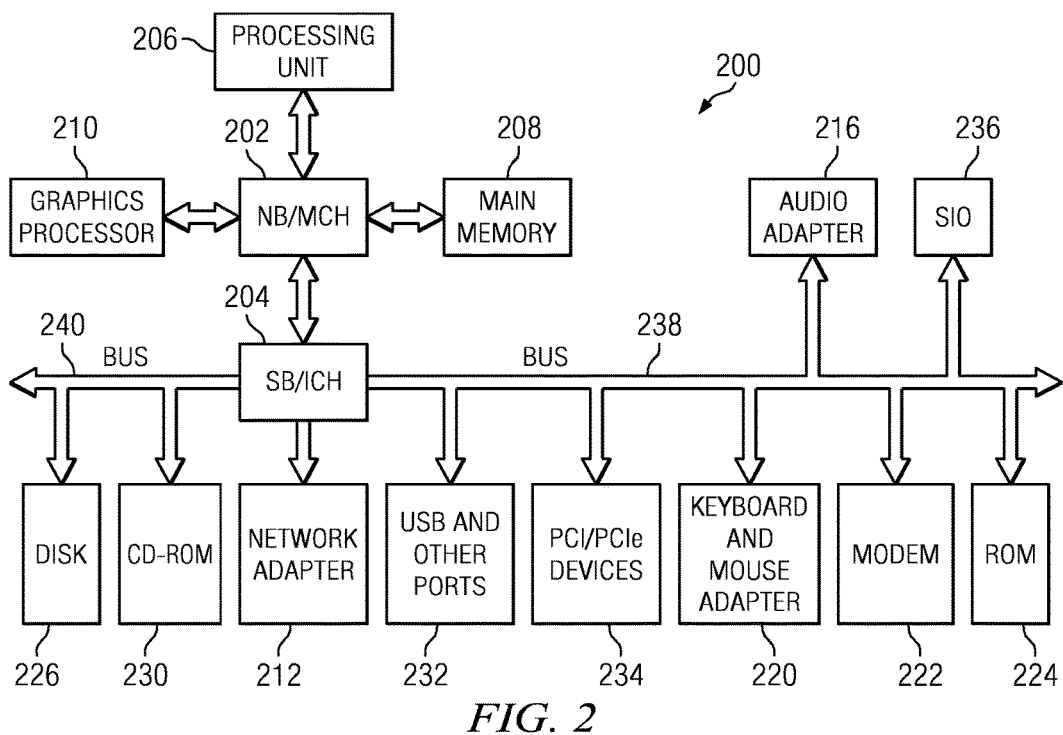
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 201) is an example of a computer, such as client 110 in FIG. 1, in which computer usable code or instructions implementing the processes for illustrative embodiments of the disclosure may be located.

In the depicted example, data processing system 200 employs a hub architecture including bridge and memory controller hub (NB/MCH) 202 and bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224: hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include; for example. Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating, system, the object-oriented programming system, and applications or programs are located on storage devices, such as HDD 226, and may be loaded into main memory 208 for execution by processing unit 206. The processes for illustrative embodiments of the disclosure may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between afferent components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

A distributed data processing system such as described and illustrated above typically comprises many software applications and utilities.

Figure 3:
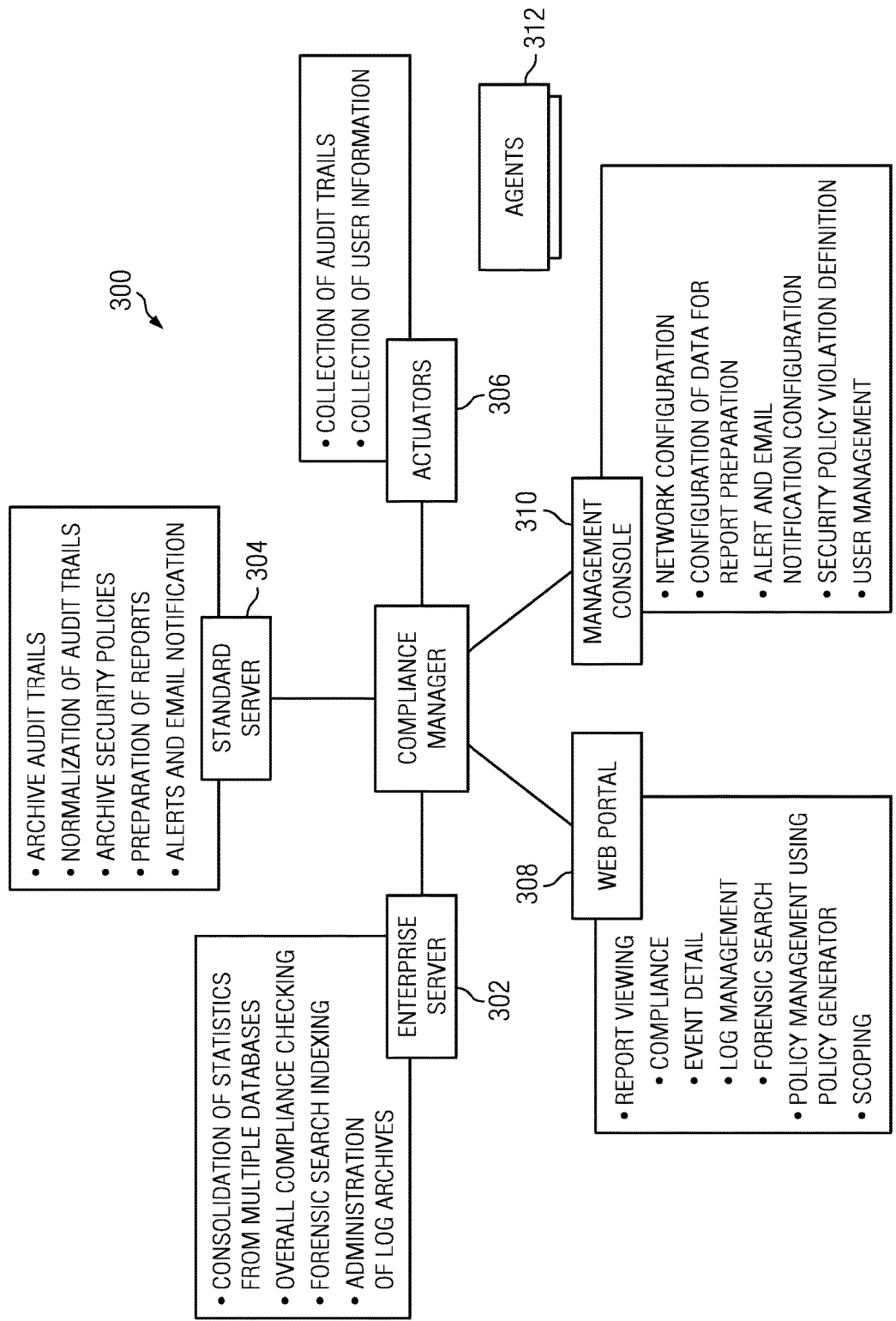
FIG. 3 is an exemplary block diagram of the operational components of a compliance manager system in which exemplary aspects of the illustrative embodiments may be implemented.

An automated compliance manager solution for monitoring, investigating and reporting on user activity across an enterprise is illustrated in FIG. 3. As will be described below, the subject disclosure may be implemented within such a compliance system. One such automated solution is available commercially as Tivoli® Compliance Insight Manager, available from IBM® Corporation. This solution is a security compliance system, which operates on a network within or across an enterprise environment to collect, analyze and archive log data and to produce detailed security reports on information security policy compliance. While the subject disclosure is described within the context of such a system, this description is merely for exemplary purposes and is not to be taken by way of limitation. The techniques described here are applicable to any compliance management system or service.

As seen in FIG. 3, the compliance manager system 300 has a number of components: an enterprise server 302, a standard server 304, one or more actuators 306, a Web-based portal 308, and a management console 310. A typical cluster configuration comprises one enterprise server and one or more standard servers. A standard server 304 typically is a Windows-based server that collects, archives, normalizes, and reports on log data from audited systems and devices. The enterprise server 302 typically is also a Windows-based server that provides centralized log management and forensic functions, enabling these features to operate across multiple standard servers 304. The enterprise server 302 provides a consolidated view of log collections and log continuity, in addition to providing a log data search and download capability. Each of the servers typically includes the Web-based portal 308, which is a user interface that provides a trend dashboard, event drill-down capability, and detailed reporting capability. The user interface may also be used for building security policies. Each server may also include the management console 310, which serves as an administrative interlace for configuring policies and for adding, removing, and managing audited systems. An actuator 306 is a software component that maintains a secure connection between the standard server 302 and one or more software agents 312 running on the audited systems. Actuator scripts enable the software agent 312 to collect data (such as, without limitation, audit data) from supported platforms, which are also referred to as "event" sources.

In operation, devices and systems throughout an organization's network are instrumented with the software agents 312. These devices and systems generate logs of user activities, processes, and event every time a person or system interacts with the network. These logs provide a record of all network activities and can be analyzed to show whether user behavior is in compliance with a given policy, such as a security policy. (As noted above, the subject disclosure is not limited for use with security-based compliance policy system). Moreover, although for discussion purposes the system is described in the context of collecting "audit" logs, this is not a limitation of the invention either, as the disclosed functionality may be used with any type of logging component regardless of the type of log data being collected. Thus, in a representative example, compliance manager system 300 works by collecting audit data from audited systems and devices in the network. An event source enables the compliance manager system to collect audit data from different platforms and operating systems. Once the compliance manager system has collected the audit data, it processes them by normalizing the logs into easily-searched fields. During processing, the compliance manager compares all logs to established security policies. Policy breaches and other suspicious or unusual events are then identified by alerts, notifications, trend graphs and reports. The portal provides the security status of the audited systems.

Figure 4:
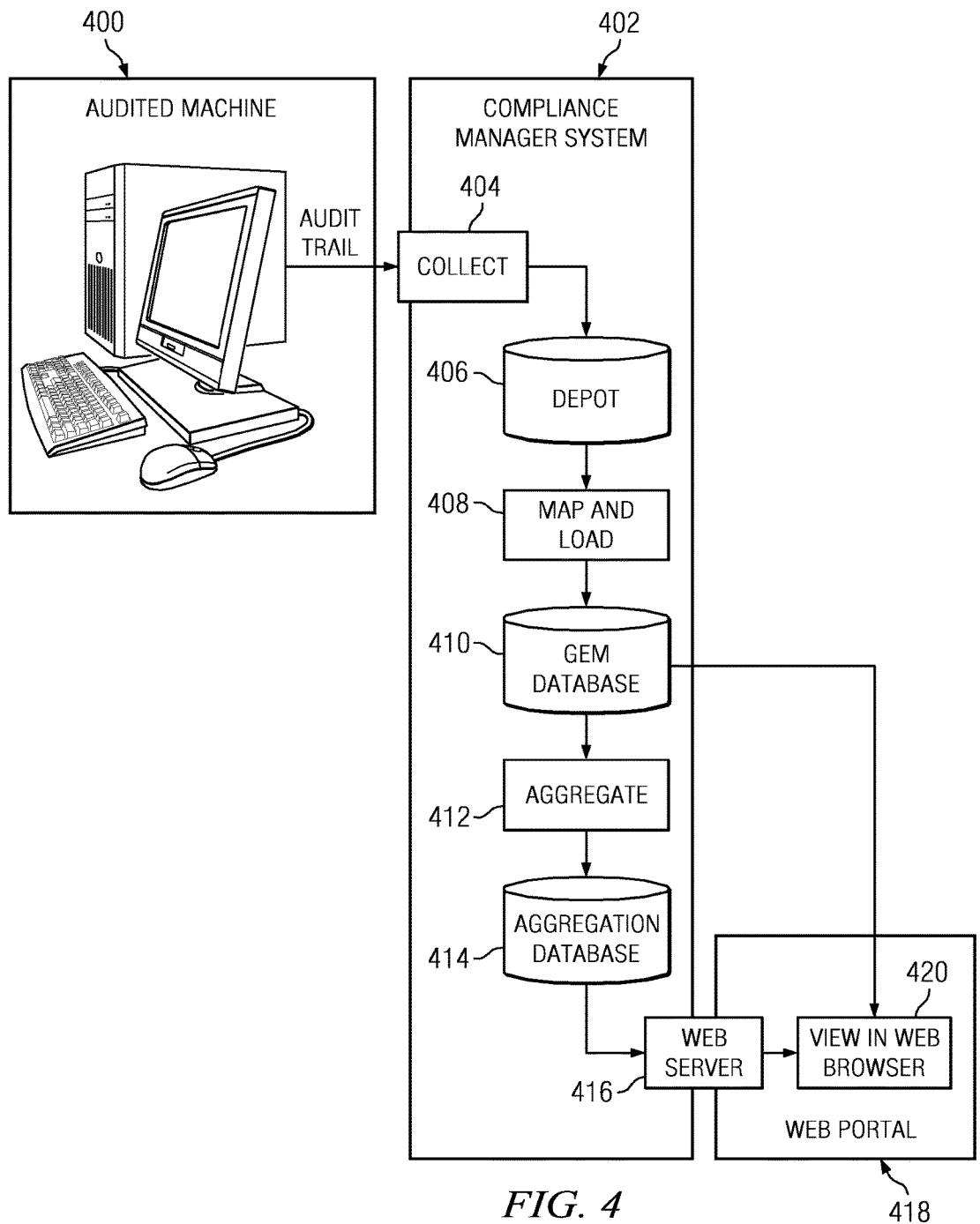
FIG. 4 is a diagram illustrating components of the compliance manager system of FIG. 3 for collecting audit logs from an audited machine.

FIG. 4 illustrates the operation of the compliance manager system 402 with respect to an audited machine 400. In particular, the compliance manager system 402 retrieves audit data from the audited machine 400 using a collect process 404. The collect process retrieves data in one of several ways, such as hatch collect, point of presence collect, SSH, remote collect, syslog collect, SMTP collect, and the like. Once the audit data has been collected, the original log data is stored in a centralized log depot 406. The depot 406 supports a data centralization function, and preferably data remains there until it is expressly backed up and removed. Audit data in the log depot 406 is indexed, which facilitates search queries and log retrieval for forensic analysis. A log manager process (not shown) provides centralized log management, reporting on log collection activities, and log search and retrieval functions. Retrieved logs can be analyzed using external tools. After audit data has been collected and stored, the logs may be normalized into a generic event model (GEM) format using a map and load process 408. The mapped data is stored in a GEM database 410, which is periodically emptied and loaded with more recent data. After audit data has been normalized in the GEM database 410, the standard server builds a special database using a process called aggregation 412. The purpose of aggregation is to summarize all of the data to create trend and summary reports, which span a longer time period than the data in the GEM database. The aggregation data is stored in database 414. Moreover, the aggregation data from multiple (or all) servers in the cluster may be collected by a process called consolidation (not shown). The data generated by the consolidation process may also be stored in a database. Once these processes have occurred, various reports and trending facilities are available through the Web portal 418, which comprises a Web browser client 420 using a web-based reporting application that executes on Web server 416. The user can review trend graphics, showing the status of security events over time, examine the contents of the GEM, aggregation and consolidation databases, drill down into security events, perform administrative tasks to manage security events, and run numerous reports on the data.

Although not meant to be limiting, the compliance system such as described and illustrated in FIGS. 3-4 may include one or more application-specific management modules for managing given enterprise compliance activities. These modules may include, for example. Sarbanes-Oxley (SOX) management, International Standards Organization (ISO) 17799 management. Gramm-Leach-Bliley Act (GLBA) management, Health Insurance Portability and Accountability Act (HIPAA) management, Basel II management, and others. Of course, this list is not exhaustive. Typically, each module provides for the creation and use of an asset classification template that shows the groups of information, people and other IT assets in the enterprise that are affected by the policy, and a policy template that measures event data against a customizable, predefined policy that determines who should be allowed access to sensitive data and what each group of people should be able to do with the information. The module also includes a report center that uses the asset classification and policy templates to provide compliance reports geared to the requirements or best practices, and IT controls implemented within the organization.

Figure 5:
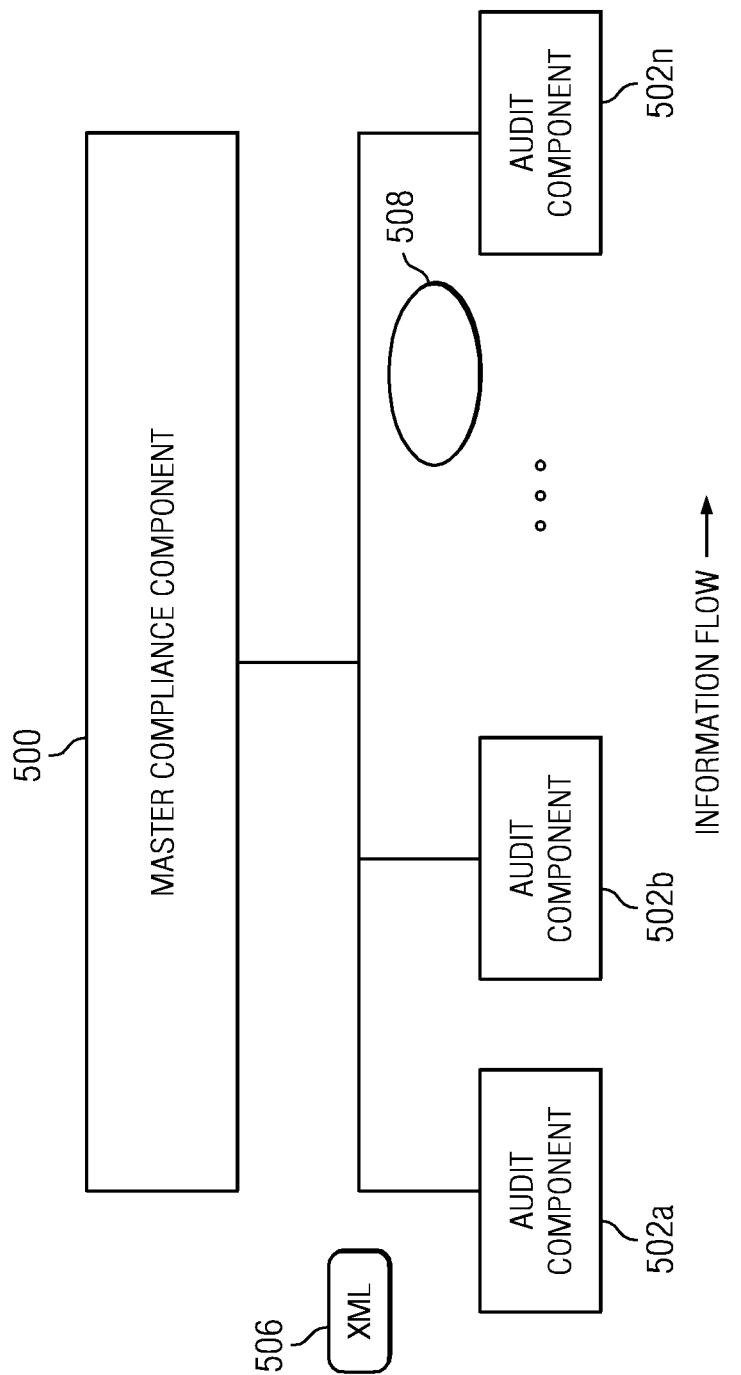
FIG. 5 is a diagram illustrating how a set of audit components are managed by a master compliance component according to this disclosure.

Referring now to FIG. 5, it is assumed that the compliance system (such as described and illustrated above) is operating within the context of a "multiple-component" logging (e.g., auditing) environment. As noted above, the techniques described herein are not limited to any particular type of logging component. In particular, in this environment it is assumed that the particular compliance policy at issue is enforced (or, more generally, monitored) by a set of log-enabled components 502*a*, 502*b* . . . 502*n* that operate across one or more diverse systems and devices and that are capable of being triggered during a given information flow 504. One or more of the log-enabled components 502 typically are located remotely from one another. According, to a feature of this disclosure, the individual log-enabled components 502 are configured and managed collectively by a master compliance component 500, as will be described. Typically, one or more of the log-enabled components 502 also are located remotely from the master compliance component 500, but this is not a requirement. The master compliance component 500 may be implemented within the enterprise server as described above with respect to FIG. 3, or in association with one or other enterprise systems or machines. In FIG. 5, the information flow 504 is shown in a linear manner starting with log-enabled component 502*a*, then log-enabled component 502*b*, etc. but this is merely for illustrative purposes. The information flow 504 need not be linear, as one or more of the log-enabled components 502 may execute in parallel, or in any other sequence. Generally, an information flow 504 comprises a set of interdependent operations using various systems and devices, each of which is instrumented with an audit component. A log-enabled component 502 may be implemented in any convenient fashion, such as by the collect process that was described above in FIG. 4. More generally, the log-enabled component is a software agent running on a machine or device. Typically, the log-enabled component or "agent" is a computer program implemented as a set of processor-executed computer instructions.

In one embodiment, the log-enabled component is an audit component. In another embodiment, the log-enabled component is an error log component. In still another embodiment, the log-enabled component is a trace logging component. In yet another embodiment, at least one of the log-enabled components is of a first type, while a second one of the log-enabled components is of a second type that differs from the first type.

As will be seen, the master compliance component 500 (or "compliance utility") receives data from each log-enabled component 502 in the set of log-enabled components. The data indicates a set of logging properties that are associated with or provided by that log-enabled component. In operation, the master compliance component 500 determines, for a given compliance policy, which of a set of one or more events are required from one or more of the individual log-enabled components 502 in the set of log-enabled components. As a result of the determining step, the master compliance component 500 then configures one of more of the individual log-enabled components 502, e.g., by generating one or more configuration events that are then sent to the one or more individual components. This configuration may lake place remotely, i.e., over a network connection, if a particular log-enabled component is located remotely from the master compliance component. When the information flow occurs, logs (e.g. audit logs, error logs, trace logs, etc.) are then collected from the log-enabled components. The systems shown in FIG. 4 are used to collect the log data from the multiple log-enabled component sources, and to process and aggregate that data as necessary to generate aggregate and consolidated data. The master compliance component 500 evaluates the collected logs to determine compliance with the compliance policy. As necessary, the master compliance component re-configures one or more log-enabled components in the set of log-enabled components to address any compliance issues arising from the evaluation.

In particular, according to this disclosure, the master compliance component 500 is responsible for examining the logs produced by the individual log-enabled components 502 involved in a particular information flow 504, and the master compliance component is capable of configuring (or re-configuring, as the case may be) these individual log-enabled components to produce the audit and/or other logs required for a given compliance policy. Thus, according to the teachings herein, once the given compliance policy is specified, typically the individual log-enabled components in the multiple-component environment are not responsible for their own configuration and management: as that task is undertaken by the master compliance component 500. Instead, the master compliance component 500 is able to configure the logging of required events at the set of individual log-enabled components, as required, to satisfy the compliance policy. In this manner, the compliance policy is said to be "distributed."

Each log-enabled component 502 in the information flow 504 preferably publishes a properties file 506, typically in the form of XML. The properties file 506 indicates a set of one or source events for which the log-enabled component is capable of producing a log (or log entry). The data in this file correspond to events in one or more known data formats, such as CBE, WEF, WSDM, or the like. The master compliance component 500 is able to consume the information in the properties file 506 and use it to determine which events must be logged to support a given compliance policy. In addition, this information is displayable to an administrator, who can then design, build and review data from custom logs. The information from the individual audit component may also be used as part of a predefined compliance report "pattern," where the pattern defines all of the events that are to be logged to produce a particular report.

Once the master compliance component 500 has determined (based on template-based reports or configuration by an administrator) which events are required from the individual log-enabled components 502, the master compliance component 500 generates one or more configuration events 508 that are sent to these individual log-enabled components.

It is known in the art that a given logging component may allow configuration of the level of detail that is including in a log event (for both audit and event logging). Each component also may be configured by an individual component administrator. Individual component administrators may choose to have minimal logging in place to minimize the log storage space required for the individual component. By using the master compliance component according to the teachings herein, however, more granularity may be required for certain events that are produced by a given individual component. Accordingly, in such case the master compliance component configures or re-configures the level of logging granularity at individual components to ensure that each component in the multi-component environment produces sufficiently rich logs that can be used by the master compliance component.

As a concrete example, assume that components A and B participate in the overall processing. Moreover, assume that component A does not have sophisticated audit logging because, for example, it is a legacy component, but that it can provide robust trace logging. In a typical scenario, this trace logging capability might be turned off (set to "NONE") for perceived performance reasons. Component B produces audit log data, for example, on a rolling basis (so data is over-written with a 24 hour rollover period). Using the discovery techniques described herein, the master compliance component examines component A's logging configuration metadata and sees that the "trace logging" is set to "NONE." It also examines component B's logging configuration metadata and sees that the rollover period is 24 hours. As part of a need to generate an overall compliance report, however, it is assumed the master compliance component needs to have more comprehensive data from both of these components. e.g. data that is staged and archived over a 7-day period. In response, the master compliance component updates the value of the trace logging parameter in component A from "NONE" to "MIN" and will restart component A if necessary so that component A will pick up this new configuration parameter. Likewise, the master component updates component B's configuration parameters to a 7-day log, rolled across three log instances, so that there is always at least a two-week log of data (the previous two weeks in their entirety and the current week as far as it has progressed). The master component restarts component B as necessary so that component B will pick up this new configuration parameter. The updates sent to component A and component B may take concurrently, or a different times. This completes the process.

In this manner, the master compliance component configures the individual log-enabled components in a manner to remove redundant or unnecessary events, to omit events that might cause inconsistencies in the logged data, to optimize the performance of the individual log-enabled components, and to ensure that the logs are collected in a reliable, scalable and highly-available manner. The knowledge of how best to accomplish the individual compliance component configuration (and the associated data collection from those components) necessarily resides in the master compliance component 500, and this relieves the administrator and the system from having to configure the individual log-enabled components. As a convenient by-product, the individual log-enabled components are simple to design and implement as compared to the prior art. In one embodiment, the configuration events generated by the master compliance component are sent as web services-based configuration requests, for example (allowing a direct interface to the individual component's management functionality). In an alternative embodiment, these requests are used to configure the log-enabled component's local properties file.

The "remote" configuration of an individual log-enabled component's logging properties may have one or more unintended consequences, such as changing the frequency with which a collected log must be rolled over, that may need to be addressed. If desired, the master compliance component-configured logging records may be tagged as such so that, if necessary, they can be filtered out of the individual component's "regular" log and fed into a specific log used just by the master compliance component. Although not a requirement, the master compliance component includes one or more predefined compliance reports, with each report identifying the dependencies on the types of logging records required to generate the report. Through a user interface, an administrator selects one of these reports, which selection prompts the master configuration component to push the required configuration information to the related individual log-enabled components to ensure that the information required to generate the report: is in fact being logged by that component.

The user interlace such as described above may include a report designer tool that may be used to trigger the compliance utility to configure or re-configure the individual log-enabled components as required to support the desired report. Thus, in one embodiment, an administrator uses the report designer tool to generate a custom report associated with a given compliance policy. That policy is distributed in the sense that it is carried out by a set of individual log-enabled components, at least one of which is located remotely from another such log-enabled component or the compliance utility itself. As the administrator designs the desired report (e.g., using a drop-and-drag interface, a text editor, or the like), the master compliance utility retrieves the properties files 506 from one or more affected (or required) log-enabled components, determines the configuration events as necessary to enforce the policy, and issues those configuration events to configure the individual log-enabled components as necessary. Upon the information flow, the individual log-enabled components collect their logs and provide them to the master component, which aggregates the data, and publishes it to the reporting systems.

As described herein, the master compliance component (the compliance utility) is executed on a compliance server as a special purpose computer or machine.

As also described above, the distributed compliance functionality herein is not limited to logging audit events. The techniques may be used with any type of logging functionality including, without limitation, audit logging, trace logging, error logging, or combinations of the above. By including event trails in the type of data collected (for example, those used in debugging), the techniques may be used in deployments that allow for remote configuration of event logging in response to problem determination. Thus, a problem determination application (PDA) may be provisioned with or executed in association with the described functionality to use the same techniques described herein to set the logging granularity for the application to a given level required to debug or identify a given problem, after which the logging levels can be reset once the problem is identified and resolved.

Thus, according to the present invention, a given application that is associated with the described functionality may be configured or reconfigured at any time, including if necessary at runtime.

The discovery, assessment and configuration steps described herein may be used with an existing compliance assessment tool, or that compliance assessment function may be included with these steps.

As noted above, individual log-enabled components may be separately configured (by different people having different logging requirements). The above-described subject matter enables those individual requirements to be normalized (or overridden) given the overall end-to-end logging requirements for the information flow.

As used herein, the configuring of an individual log-enabled component may include configuration of log retention and/or rollover parameters, modifying or preventing log rollover, changing which logs get overwritten, modifying event log destination, and so forth. Thus, generalizing, the configuration step provided by the master configuration component should be broadly construed to include any changes to a configuration and/or characteristic of the component itself or to a log file generated by the log-enabled component.

The block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer, program product accessible from a computer-usable or computer-readable medium providing program code for use by or in connection with a computer or any instruction execution system. For the purposes of this description, a computer-usable or computer readable medium can be any tangible apparatus that can contain or store the program for use by or in connection with the instruction execution system, apparatus, or device.

The medium is tangible, and it can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, hulk storage, and cache memories which provide temporary storage of at least some program code to reduce the number of times code must be retrieved from hulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described to best explain the principles of the invention, the practical application, and to enable others of ordinary skill in the art to understand the invention for various embodiments with various modifications as are suited to the particular use contemplated.

Having described our invention, what we now claim is as follows:

1. A method for automated policy compliance in a data processing system comprising:

configuring a set of log-enabled components in an audit environment that includes multiple diverse physical devices, at least one log-enabled component being of a first type and supported on a first of the multiple diverse physical devices, and at least one log-enabled component being of a second type distinct from the first type and supported on a second of the multiple diverse physical devices, wherein a log-enabled component is a software agent that captures log event data;

during an information flow, capturing, by each of the set of log-enabled components, log event data;

receiving, at a compliance server executing in hardware, logging property data from each log-enabled component in the set of log-enabled components, the logging property data distinct from the log event data captured by the log-enabled component during the information flow and indicating a set of one or more logging properties associated with the log-enabled component;

determining, at the compliance server, based at least in part on the logging property data received, which of a set of one or more log events are required from individual log-enabled components in the set of log-enabled components to support a compliance policy being managed by the compliance server;

configuring, by the compliance server, each log-enabled component in the set of log-enabled components to capture the one or more log events so determined for that individual log-enabled component, wherein configuring at least one log-enabled component in the set of log-enabled components includes restarting the log-enabled component and providing a directive to update a logging property otherwise set at that log-enabled component; and evaluating logs collected from the set of log-enabled components to determine compliance with the compliance policy.

2. The method as described in claim 1 wherein the logs are evaluated by the compliance server.

3. The method as described in claim 1 wherein the set of logging properties for the log-enabled component identifies a set of log events that the log-enabled component is capable of logging.

4. The method as described in claim 1 wherein the set of logging properties for the log-enabled component identifies a configuration or a characteristic of a log file generated by the log-enabled component.

5. The method as described in claim 1 wherein the log-enabled component is one of: an audit log component, an error log component, a trace log component, and a combination of one or more such components.

6. The method as described in claim 1 wherein the configuring step is performed remotely as a web service.

7. The method as described in claim 1 further including tagging at least one log to identify that the at least one log-enabled component has been configured.

8. The method as described in claim 1 wherein the compliance policy is predefined.

9. The method as described in claim 1 wherein the compliance policy is a custom policy.

10. The method as described in claim 1 wherein the compliance policy is an enterprise compliance policy.

11. An apparatus for automated compliance processing comprising:

a set of log-enabled components positioned in an audit environment that includes multiple diverse physical devices, at least one log-enabled component being of a first type and supported on a first of the multiple diverse physical devices, and at least one log-enabled component being of a second type distinct from the first type and supported on a second of the multiple diverse physical devices, wherein a log-enabled component is a software agent that captures log event data during an information flow across the multiple diverse devices;

a processor;

a computer memory holding computer program instructions executed by the processor, the computer program instructions comprising:

program code to receive logging property data from each log-enabled component in a set of log-enabled components that are triggered during an information flow, wherein the information flow occurs in an audit environment that includes multiple diverse physical devices, at least one log-enabled component being of a first type and supported on a first of the multiple diverse physical devices, and at least one log-enabled component being of a second type distinct from the first type and supported on a second of the multiple diverse physical devices, wherein a log-enabled component is a software agent that captures log event data, the logging property data distinct from log event data captured by the log-enabled component during the information flow and indicating a set of one or more logging properties associated with the log-enabled component;

program code to determine, based at least in part on the logging property data received, which of a set of one or more log events are required from individual log-enabled components in the set of log-enabled components to support a compliance policy being managed by the apparatus, wherein the individual log-enabled components are not responsible for their own configuration and management;

program code to configure each log-enabled component in the set of log-enabled components to capture the one or more log events so determined for that individual log-enabled component, wherein the program code to configure restarts the log-enabled component and provides a directive to update a logging property otherwise set at one of the log-enabled components; and program code to evaluate logs collected from the set of log-enabled components to determine compliance with the compliance policy.

12. The apparatus as described in claim 11 wherein the log-enabled components are one of: an audit log component, an error log component, a trace log component, and a combination of one or more such components.

13. The apparatus as described in claim 11 wherein the log-enabled component is configured remotely via a web service.

14. The apparatus as described in claim 11 wherein the compliance policy is predefined.

15. The apparatus as described in claim 11 wherein the compliance policy is a custom policy.

16. The apparatus as described in claim 11 wherein the compliance policy is an enterprise compliance policy.

17. The apparatus as described in claim 11 wherein the set of logging properties for the log-enabled components is one of: a set of log events that the log-enabled component is capable of logging, and a configuration or a characteristic of a log file generated by the log-enabled component.

18. A computer program product in a non-transitory computer readable medium for use in a data processing system for automated compliance processing, the computer program product holding computer program instructions which when executed by the data processing system perform operations comprising:

receiving logging property data from each log-enabled component in a set of log-enabled components that are triggered during an information flow, wherein the information flow occurs in an audit environment that includes multiple diverse physical devices, at least one log-enabled component being of a first type and supported on a first of the multiple diverse physical devices, and at least one log-enabled component being of a second type distinct from the first type and supported on a second of the multiple diverse physical devices, wherein a log-enabled component is a software agent that captures log event data, the logging property data distinct from log event data captured by the log-enabled component during the information flow and indicating a set of one or more logging properties associated with the log-enabled component;

determining, based at least in part on the logging property data received, which of a set of one or more log events are required from individual log-enabled components in the set of log-enabled components to support a compliance policy being managed by the data processing system, wherein the individual log-enabled components are not responsible for their own configuration and management;

configuring each log-enabled component in the set of log-enabled components to capture the one or more log events so determined for that individual log-enabled component, wherein configuring at least one log-enabled component in the set of log-enabled components includes restarting the log-enabled component and providing a directive to update a logging property otherwise set at that log-enabled component; and evaluating logs collected from the set of log-enabled components to determine compliance with the compliance policy.

19. The computer program product as described in claim 18 wherein the log-enabled components are one of: an audit log component, an error log component, a trace log component, and a combination of one or more such components.

20. The computer program product as described in claim 18 wherein the log-enabled component is configured remotely via a web service.

21. The computer program product as described in claim 18 wherein the compliance policy is predefined.

22. The computer program product as described in claim 18 wherein the compliance policy is a custom policy.

23. The computer program product as described in claim 18 wherein the compliance policy is an enterprise compliance policy.

24. The computer program product as described in claim 18 wherein the set of logging properties for the log-enabled components is one of: a set of log events that the log-enabled component is capable of logging, and a configuration or a characteristic of a log file generated by the log-enabled component.

* * * * *